United States Patent
Byrne

(10) Patent No.: US 10,636,013 B2
(45) Date of Patent: *Apr. 28, 2020

(54) USING MOBILE PHONE DATA TO LOG ACTIVITIES AND GENERATE ACTIVITY RECORDS

(71) Applicant: FinancialForce.com, Inc., San Francisco, CA (US)

(72) Inventor: Matthew James Byrne, Harrogate (GB)

(73) Assignee: FINANCIALFORCE.COM, INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/420,076

(22) Filed: May 22, 2019

(65) Prior Publication Data

US 2019/0279162 A1 Sep. 12, 2019

Related U.S. Application Data

(63) Continuation of application No. 15/853,150, filed on Dec. 22, 2017, now Pat. No. 10,346,809.

(51) Int. Cl.
| | |
|---|---|
| *G06Q 10/10* | (2012.01) |
| *G06F 16/23* | (2019.01) |
| *H04W 4/021* | (2018.01) |
| *G06F 16/9537* | (2019.01) |
| *H04W 4/02* | (2018.01) |
| *G06F 16/909* | (2019.01) |
| *H04W 4/029* | (2018.01) |

(52) U.S. Cl.
CPC ...... *G06Q 10/1091* (2013.01); *G06F 16/2379* (2019.01); *G06F 16/909* (2019.01); *G06F 16/9537* (2019.01); *H04W 4/02* (2013.01); *H04W 4/021* (2013.01); *H04W 4/029* (2018.02)

(58) Field of Classification Search
CPC ............ G06Q 10/1091; G06F 17/3087; G06F 17/30377; H04W 4/021
See application file for complete search history.

(56) References Cited

U.S. PATENT DOCUMENTS

| | | | | |
|---|---|---|---|---|
| 2008/0114683 | A1* | 5/2008 | Neveu | G07C 1/10 705/50 |
| 2013/0090090 | A1* | 4/2013 | Rivere | G06Q 10/06 455/411 |
| 2014/0114683 | A1 | 4/2014 | Natanzon et al. | |
| 2014/0344119 | A1 | 11/2014 | Haines | |
| 2015/0094097 | A1 | 4/2015 | Fraccaroli | |
| 2017/0206454 | A1 | 7/2017 | Jihn | |

* cited by examiner

*Primary Examiner* — Joseph E Dean, Jr.
(74) *Attorney, Agent, or Firm* — Perkins Coie LLP

(57) ABSTRACT

Various embodiments concern obtaining mobile device data and generating activity logs. More specifically, mobile device data such as data indicating the location and time of a mobile device is obtained. The time and location may be automatically obtained and recorded using location service APIs on the mobile device. The obtained data is then used to generate a report including the time, duration, and location of activities associated with the user of the mobile device. Thus, an activity log is automatically generated using the time and location data.

19 Claims, 7 Drawing Sheets

Fig. 5

USING MOBILE PHONE DATA TO LOG ACTIVITIES AND GENERATE ACTIVITY RECORDS

CROSS-REFERENCE TO RELATED APPLICATIONS

This application is a continuation of copending U.S. application Ser. No. 15/853,150 filed Dec. 22, 2017, which is incorporated herein by reference in its entirety by this reference thereto.

TECHNICAL FIELD

The invention relates to data gathering and processing. The invention more particularly relates to obtaining mobile device data indicating location data to generate activity records.

BACKGROUND

Activity logs allow individuals and corporations to record activity times and the location that the task or activity was performed. This information is useful for keeping record of past activities, generating reports for accounting or professional services purposes, evaluating the time expended on a task or project, ensuring that tasks are performed on schedule, managing resources to ensure that tasks or projects are completed within budget, and planning for future activities.

Activity logs generally rely on manual input by a user or employee. For example, a person may keep a log indicating when the person entered or exited a location. The person may then manually calculate the elapsed time between when the person entered and exited the location. The person may also use an electronic device for inputting the time and location data associated with a task or project. For instance, the person may use a spreadsheet on a computer or professional services software to manually enter the time and location information.

Manual data entry tasks encounter several problems. For instance, data entry is a tedious and time-consuming task that interrupts a user from their activity or task. Additionally, data entry relies on the ability of the user to accurately remember and input the data. A user may not enter time entries as they occur and then must recall the time data later. There may also be typos and other errors that reduce the accuracy of manually entered data. Additionally, a client who performs cash accounting may only pay for services or sale of products billed in the period (e.g. month, quarter, etc.) for which they occur. Thus, any billable time data reported late may not be paid by the client. These issues can cause significant problems, particularly for employees who face deadlines and other time constraints when performing activities and tasks at different work sites or project locations.

SUMMARY

An apparatus and method for obtaining mobile device data and generating activity logs are described herein. The method may be performed by a processor and includes the step of obtaining a first location data indicative of a first location of a mobile device, an entry time data indicative of when the mobile location device entered the first location, an exit time data indicative of when the mobile location device exited the first location, and a user data indicative of a user associated with the mobile device. The method further includes the step of creating a first record including the first location data, entry time data, exit time data, duration data derived from the entry time data and exit time data, and user data. Another step includes accessing a project data including a project identifier indicative of a project to be performed at a second location and a second location data indicative of the second location. Additional steps include associating the first record with the project data, creating a second record including the duration data from the first record and the project identifier from the project data, generating a timecard entry based on the second record and indicating the duration the employee spent working on the project, and transmitting the timecard entry to the user.

The apparatus for obtaining mobile device data and generating activity logs using the obtained mobile device data includes a processor and a memory that includes instructions. When executed by the processor, the instructions cause the processor to obtain a first location data indicative of a first location of a mobile device, an entry time data indicative of when the mobile location device entered the first location, an exit time data indicative of when the mobile location device exited the first location, and a user data indicative of a user associated with the mobile device. The instructions further cause the processor to create a first record including the first location data, entry time data, exit time data, duration data derived from the entry time data and exit time data, and user data. The instructions also cause the processor to access a project data including a project identifier indicative of a project to be performed at a second location and a second location data indicative of the second location. The instructions may additionally cause the processor to associate the first record with the project data, create a second record including the duration data from the first record and the project identifier from the project data, generate a timecard entry based on the second record and indicating the duration the employee spent working on the project, and transmit the timecard entry to the user.

BRIEF DESCRIPTION OF THE DRAWINGS

FIG. 5 depicts another GUI that displays data and facilitates obtaining mobile device data and generating activity logs.

DETAILED DESCRIPTION

Cloud platforms such as a Software-as-a-Service ("SaaS") platform and the SALESFORCE platform allow for sharing processing resources and data in a multi-tenant network that offers computing services on demand to customers. More generally, cloud computing enables ubiquitous, on-demand access to a shared pool of configurable computing resources, e.g. networks, servers, storage, applications, and services, which can be rapidly provisioned and released with minimal management effort. Specifically, a SaaS platform or a SALESFORCE platform may provide numerous companies with an interface for case management and task management, and a system for automatically routing and escalating events.

Systems and techniques for accessing an external service and external data are described herein. For example, systems and techniques are described for accessing location service data using the Google Android™ location services API (also referred to herein as "Google location services") or the Apple™ location services API (also referred to herein as "Apple location services"). The Google TM and Apple™ location services APIs provide location and time data of mobile devices and data indicating the times when the mobile device enters or exits a location. For example, an API call could initially be made to the Google location services API that causes external data to be read and/or fetched or otherwise obtained from a mobile device. Alternatively, a call could be made to one or more other APIs that provide access to the raw data managed by the Google location services. In some embodiments, custom adapters, e.g. Lightning Connect, are used for the SALESFORCE platform to facilitate systems and techniques for accessing an external service and external data. Additionally, data records may be created using various SaaS APIs. In one embodiment, records may be created on a SALESFORCE server using SALESFORCE APIs.

Systems and techniques for providing a GUI that organizes and displays mobile device data are described herein. The GUI may be hosted on a SaaS platform and may be a SALESFORCE interface providing access to a SALESFORCE service. Note that the term SALESFORCE interface is intended to cover any interface that allows a user to access a SALESFORCE environment. For example, a SALESFORCE interface could be a customer portal associated with SALESFORCE itself, or an interface associated with an add-on application to the SALESFORCE platform, e.g. a FINANCIALFORCE portal. The SALESFORCE interface could also be accessed via a SALESFORCE mobile application, enabled by the SALESFORCE LIGHTNING EXPERIENCE, etc.

Figure 1:
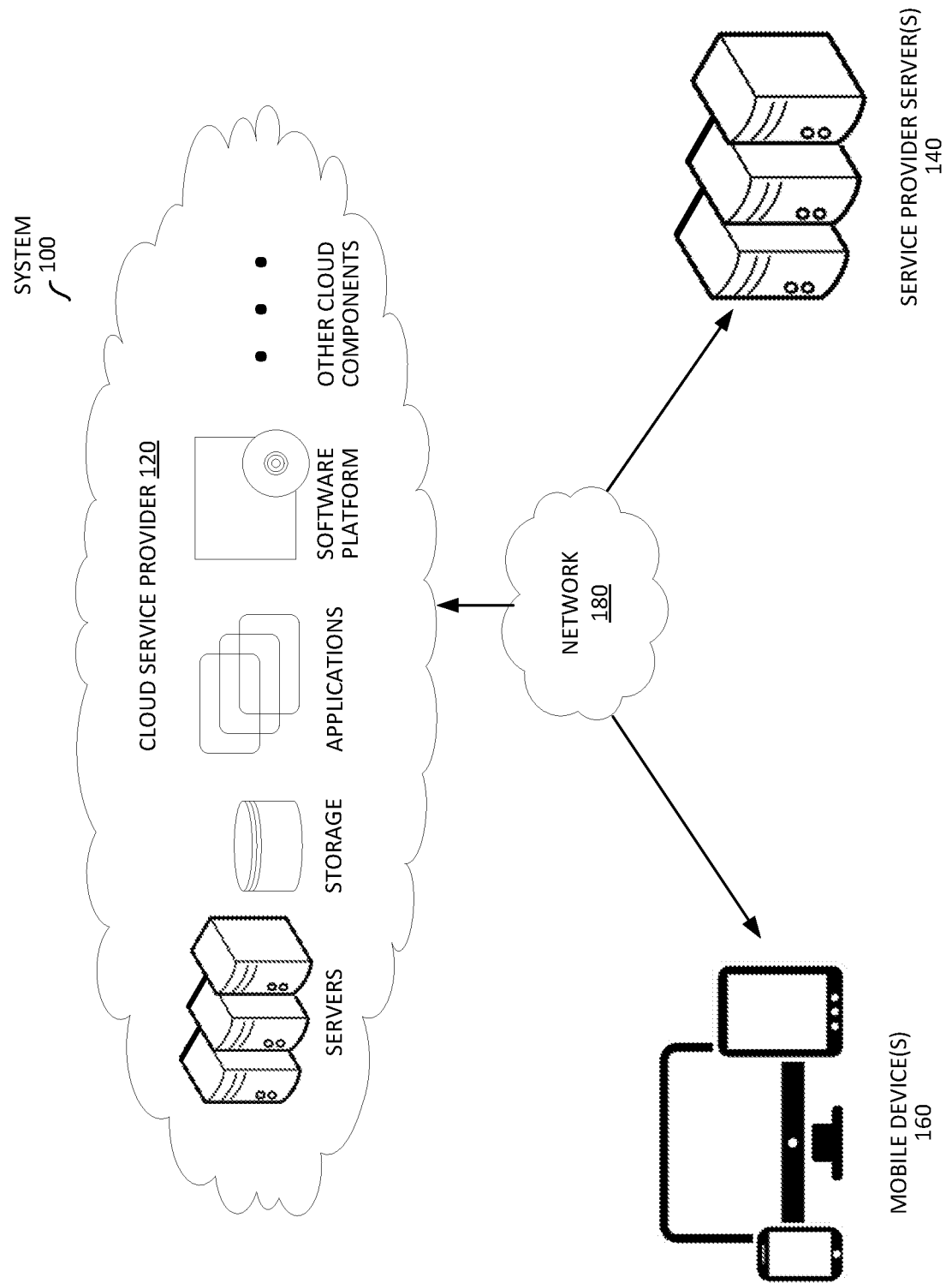
FIG. 1 depicts a high-level view of a network in which mobile device data may be obtained and activity logs generated.

FIG. 1 is a block diagram of a system 100 that implements the disclosed process for utilizing location-based services according to some embodiments of the invention. System 100 includes components such as a cloud platform 120, e.g. the SALESFORCE platform, one or more service provider servers 140 that use cloud-based services to provide add-on applications, and one or more client devices 160 that use the add-on applications, all of which are interconnected over a network 180.

The network 180 may include any combination of private, public, wired, or wireless portions. Data communicated over the network 180 may be encrypted or unencrypted at various locations or along different portions of the network 180. Each component of the system 100 may include combinations of hardware and/or software to process data, perform functions, communicate over the network 180, and the like. For example, any component of the system 100 may include a processor, memory or storage, a network transceiver, a display, an operating system, and application software, e.g. for providing a user portal, and the like. Other components, hardware, and/or software included in the system 100 are well known to persons skilled in the art and, as such, are not shown or discussed herein.

The cloud platform 120 can provide access to a shared pool of configurable computing resources including servers, storage, applications, software platform, networks, services, and the like accessed by the service provider servers 140 to offer add-on applications to client devices 160. The SALESFORCE platform, e.g. the cloud service provider 120, supports multiple tenants and is commonly referred to as a platform as a service (PaaS).

The PaaS is provided to developers for creating the add-on applications that run on the components of the cloud service provider 120. FORCE.COM is an example of a PaaS that hosts applications hosted on SALESFORCE.COM, which is an example of a cloud platform. For example, add-on applications can provide subscription billing services to users using the client devices 160. The subscription billing services are provided by the service provider servers 140 and include applications built on the software platform of the cloud platform 120.

The service provider servers 140 may include any number of server computers that provide the add-on applications such as project management or customer management services. These services provide data associated with a project or customer. Data may include identification information, physical location information, and telephone number information associated with the project or customer. Although shown separately from the cloud platform 120, the service provider servers 140 may be included as part of the cloud platform 120.

The service provider servers 140 may provide or administer a user interface, e.g. website, accessible from the client devices 160. The user interface may include features such as dashboard analytics to provide insight into how a business is performing. Examples of businesses that could benefit from subscription billing services range from SaaS (Software as a Service) providers to energy and utilities companies.

The add-on applications provided by the service provider servers 140 are built using a particular programming language. For example, FORCE.COM applications are built using APEX (a proprietary Java-like programming language for FORCE.COM) and VISUALFORCE (an XML syntax typically used to generate HTML). The code used to build applications may include functions that are accessible by the add-on applications.

Figure 2:
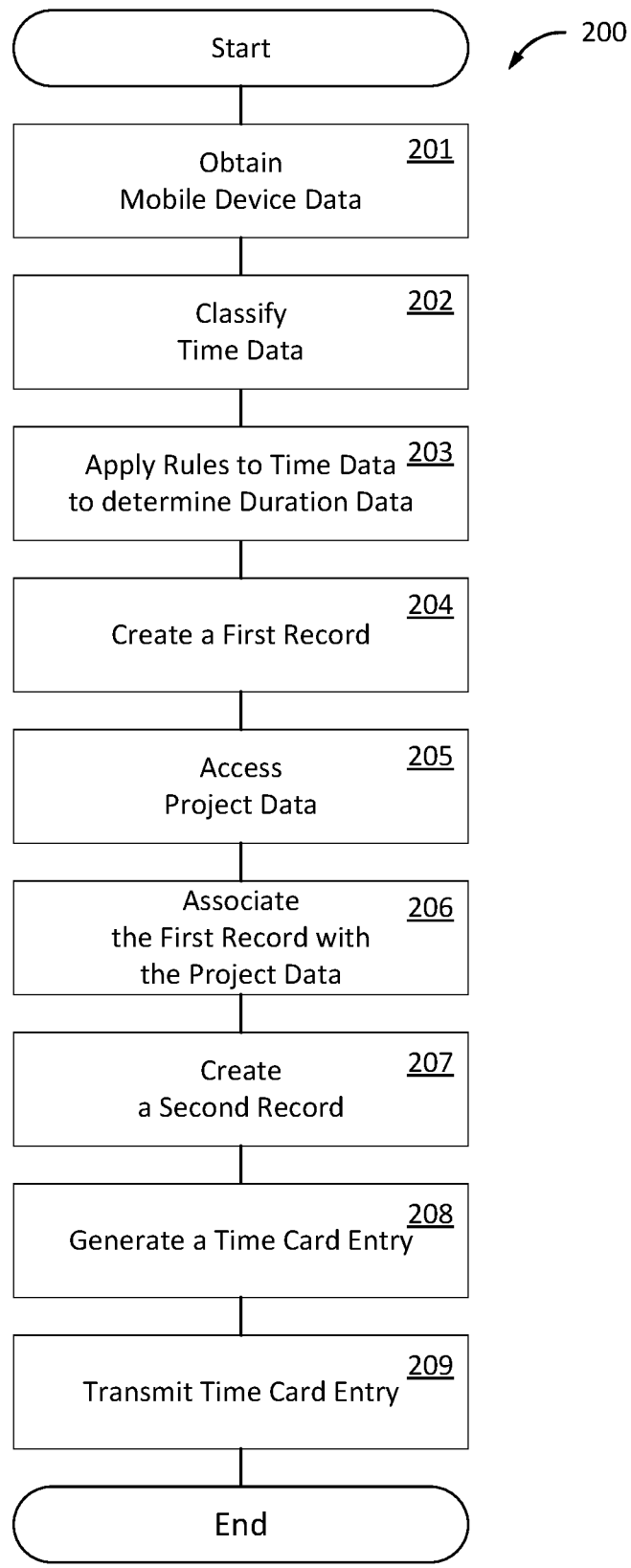
FIG. 2 depicts a process for obtaining mobile device data and generating activity logs.

FIG. 2 is a flowchart illustrating a process 200 performed on a processor that obtains mobile device data and generates records associated with the mobile device data according to some embodiments of the invention. The processor may be implemented as part of a server, e.g. cloud-based server 120, or any location suitable for facilitating the operation of a processor. In step 201, the processor obtains mobile device data gathered by a mobile device in communication with the processor. In some embodiments, the data may include a first location data indicating the physical location of the mobile device. The first location data may be a plurality of location data points wherein each location data point includes the location of a mobile device and the corresponding time. In other words, each location data point describes the location of the mobile device at a particular time. The location information may be gathered using global positioning system (GPS) signals. In some embodiments, the location data may be represented as longitude and latitude coordinates. The data may also indicate the time that the mobile device enters or exits a location. Additionally, the mobile device data may include a user data indicative of a user associated with the mobile device. For example, the user may be an employee assigned to use the mobile phone provided by an employer. The user data may be a name, user name, or employee identifier. In some embodiments, the first location data, entry time data, exit time data, duration data, and/or user data is stored on the mobile device when a data connection is unavailable and transmitted by the mobile device to the processor when a data connection becomes available. Similarly, the first location data, entry time data, exit time data, duration data, and/or user data is stored at a mobile device until additional data is gathered at the mobile device. When additional data is gathered, then the initial data and additional data are both transmitted by the mobile device to the processor.

In step 202, the processor classifies the time data as either entry time data or exit time data. The processor may look at a plurality of location data points and determine whether the mobile device is moving closer to a location or farther away from a location. For example, classifying time data as entry time data is performed by examining a sequence of location data elements and determining when a successive location data element indicates a location closer to the first location than a previous location data element. Similarly, classifying time data as exit time data is performed by examining a sequence of location data elements and determining when a successive location data element indicates a location farther to the first location than a previous location data element.

In step 203, the processor applies rules to the entry time data and exit time data to determine a duration that the mobile device was a location. For example, the rules may be applied to calculate the difference between the entry time data and the first exit time data that temporally follows the entry time data.

In step 204, the processor creates a first record containing data described above such as location data, entry time data, exit time data, duration data, and user data. The first record may be stored at a server for future access, updates, or modification. In some embodiments, the data may be stored in cloud service provider 120. In some embodiments, the data may be stored in a Software-as-a-Service (SaaS) server or SALESFORCE server. A person skilled in the art may appreciate that the first record may contain additional data associated with the location data, entry time data, exit time data, duration data, and user data.

Systems and techniques for creating a record may use a formatting module for parsing the mobile device data and formatting some or all the mobile device data so that it conforms to the format of the record. For example, the formatting module could reformat or filter the mobile device data before it is mapped to the fields of the stored record. In one embodiment, the formatting module can modify the data structure of dates, times, and location data, etc., so that the data can be properly identified by the SaaS or SALESFORCE platform. The formatting module can also establish a lookup relationship by mapping the mobile device data to one or more data fields of a record. In some embodiments, the mapping is dynamically performed based on the content of the mobile device data.

In step 205, the processor accesses project data. The data may be accessed from a server storing project data. In some embodiments, the data may be accessed from service provider servers 140. Service provider servers 140 may be located remotely from cloud service provider 120 or may be integrated with cloud service provider 120. The project data may include identification information indicative of a project and the physical location associated with the project. In some embodiments, the project may correspond to client or project worksites. For instance, the physical location may be a location of the client's office building. In other examples, the physical location may be a work site where services are performed or products are delivered for a project or client.

In step 206, the processor associates the project data accessed at step 205 with the location data stored in the first record at step 204. In some embodiments, the association is performed by matching the physical location indicated by the project data with the location data stored in the first record at step 202. The associated data may show when the mobile device was at the location of a project or client. The record created at step 204 may also include user data, e.g. data indicating the employee using or assigned to use the mobile device. By associating the user data with the matching location data and project location data, the associated data can show when the user was at the location of a project or client. One having ordinary skill in the art will understand that various mobile device data such as information indicating a time, location, entry or exit may be associated with the various project data information.

In step 207, the processor creates a second record using the data stored in the first record created at step 204 and the associated data at step 206. The second record may include information indicative of the user associated with mobile device, the time that the mobile device enters or exits a location associated with a project or client. Additionally, the record may include the duration of time that the mobile device was at a location by calculating the time that has elapsed between when the mobile device enters the location and the time the mobile device exits the location. Using this collection of data, the second record can show the time when an employee is located at the location associated with a project or client. The record may be used as a time card entry for recording the amount of time an employee works on a project or at a worksite. Additionally, the record may be used to determine whether services or deliveries are provided on schedule and within a planned time window. One having ordinary skill in the art will understand that various other uses may arise from the data gathered in process 200 such as for timekeeping, accounting, or project management purposes.

In step 208, the processor may create a time card entry based upon the data of the second record created in step 207. In some embodiments, an entry may be represented as a row in the Time Card GUI 500 of FIG. 5. In step 209, the processor may transmit the time card entry to a user. The user may be the user of the mobile device or a user associated with the project or client. After transmission, the time card entry may be displayed to the user as a row in the Time Card GUI 500 of FIG. 5. A person skilled in the art will understand that the visual representation of the time card entry is not limited to the Time Card GUI 500 and may be represented in various configurable forms.

Figure 3:
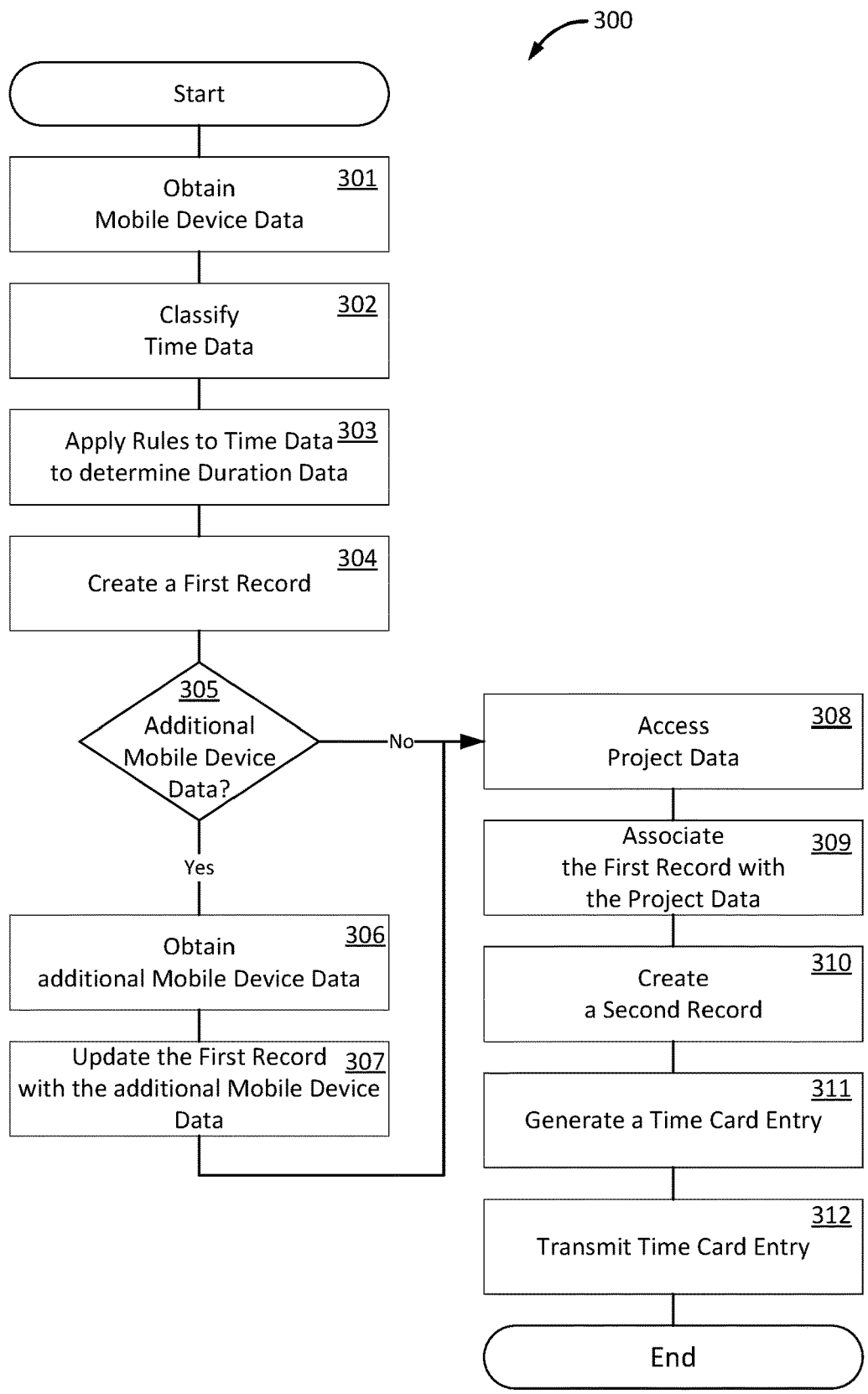
FIG. 3 depicts another embodiment of a process for obtaining mobile device data and generating activity logs.

FIG. 3 is a flowchart illustrating process 300, an alternative embodiment of a process performed on a processor that obtains mobile device data and generates records associated with the mobile device data according to some embodiments of the invention. The processor may be implemented as part of a server, e.g. cloud-based server 120. In step 301, the processor obtains mobile device data gathered by a mobile device in communication with the processor. In some embodiments, the data may include a first location data indicating the physical location of the mobile device. The first location data may be a plurality of location data points wherein each location data point includes the location of a mobile device and the corresponding time. In other words, each location data point describes the location of the mobile device at a particular time. The location information may be gathered using global positioning system (GPS) signals. In some embodiments, the location data may be represented as longitude and latitude coordinates. The data may also indicate the time that the mobile device enters or exits a location. Additionally, the mobile device data may include a user data indicative of a user associated with the mobile device. For example, the user may be an employee assigned to use the mobile phone provided by an employer. The user data may be a name, user name, or employee identifier.

In step 302, the processor classifies the time data as either entry time data or exit time data. The processor may look at a plurality of location data points and determine whether the mobile device is moving closer to a location or farther away from a location. For example, classifying time data as entry time data is performed by examining a sequence of location data elements and determining when a successive location data element indicates a location closer to the first location than a previous location data element. Similarly, classifying time data as exit time data is performed by examining a sequence of location data elements and determining when a successive location data element indicates a location farther to the first location than a previous location data element.

In step 303, the processor applies rules to the entry time data and exit time data to determine a duration that the mobile device was at a location. For example, the rules may be applied to calculate the difference between the entry time data and the first exit time data that temporally follows the entry time data.

In step 304, the processor creates a first record containing data described above such as location data, entry time data, exit time data, duration data, and user data. The first record may be stored at a server for future access, updates, or modification. In some embodiments, the data may be stored in cloud service provider 120. In some embodiments, the data may be stored in a Software-as-a-Service (SaaS) server or SALESFORCE server. A person skilled in the art may appreciate that the first record may contain additional data associated with the location data, entry time data, exit time data, duration data, and user data.

Systems and techniques for creating a record may use a formatting module for parsing the mobile device data and formatting some or all the mobile device data so that it conforms to the format of the record. For example, the formatting module could reformat or filter the mobile device data before it is mapped to the fields of the stored record. In one embodiment, the formatting module can modify the data structure of dates, times, and location data, etc., so that the data can be properly identified by the SaaS or SALESFORCE platform. The formatting module can also establish a lookup relationship by mapping the mobile device data to one or more data fields of a record. In some embodiments, the mapping is dynamically performed based on the content of the mobile device data.

In step 305, the processor determines whether the mobile device has additional mobile device data. In some embodiments, the first location data, entry time data, exit time data, duration data, and/or user data is stored on the mobile device when a data connection is unavailable and transmitted by the mobile device to the processor when a data connection becomes available. Similarly, the first location data, entry time data, exit time data, duration data, and/or user data is stored at a mobile device until additional data is gathered at the mobile device. When additional data is gathered, the initial data and additional data are both transmitted by the mobile device to the processor. Alternatively, mobile device data may be obtained by the processor as soon as they are received. When additional data is gathered, it will be subsequently obtained by the processor. For example, if the mobile device has additional mobile device data, then the processor proceeds to step 306. If the mobile device does not have additional mobile device data, then the processor proceeds to step 308.

In step 306, the processor may obtain the additional mobile device data. For example, additional first location data, entry time data, exit time data, duration data, and/or user data may have been gathered by the mobile device. In some embodiments, the additional mobile device data is obtained in the same way that mobile device data was obtained in step 301.

In step 307, the processor may update the first record to include the additional mobile device data obtained in step 306. The updated first record may include the first location data, entry time data, exit time data, duration data, and/or user data obtained in step 301 with the additional first location data, entry time data, exit time data, duration data, and/or user data obtained in step 306.

In step 308, the processor accesses project data. The data may be accessed from a server storing project data. In some embodiments, the data may be accessed from service provider servers 140. Service provider servers 140 may be located remotely from cloud service provider 120 or may be integrated with cloud service provider 120. The project data may include identification information indicative of a project and the physical location associated with the project. In some embodiments, the project may correspond to client or project worksites. For instance, the physical location may be a location of the client's office building. In other examples, the physical location may be a work site where services are performed or products are delivered for a project or client.

In step 309, the processor associates the project data accessed at step 308 with the location data stored in the first record at step 304. In some embodiments, the association is performed by matching the physical location associated with a project of the project data with the location data stored in the first record. The associated data may show when the mobile device was at the location of a project or client. The record created at step 304 may also include user data indicating the employee using or assigned to use the mobile device. By associating the user data with the matching location data and project location data, the associated data can show when the user was at the location of a project or client. One having ordinary skill in the art will understand that various mobile device data such as information indicating a time, location, entry or exit may be associated with the various project data information.

In step 310, the processor creates a second record using the data stored in the first record created at step 304 and the associated data at step 309. The second record may include information indicative of the user associated with mobile device, the time that the mobile device enters or exits a location associated with a project or client. Additionally, the record may include the duration of time that the mobile device was at a location by calculating the time that has elapsed between when the mobile device enters the location and the time the mobile device exits the location. Using this collection of data, the second record can show the time when an employee is located at a location associated with a project or client. The record may be used as a time card entry for recording the amount of time an employee works on a project or at a worksite. Additionally, the record may be used to determine whether services or deliveries are provided on schedule and within a planned time window. One having ordinary skill in the art will understand that various other uses may arise from the data gathered in process 300 such as for timekeeping, accounting, or project management purposes.

In step 311, the processor may create a time card entry based upon the data of the second record created in step 310. In some embodiments, an entry may be represented as a row in the Time Card GUI 500 of FIG. 5. In step 312, the processor may transmit the time card entry to a user. The user may be the user of the mobile device or a user associated with the project or client. After transmission, the time card entry may be displayed to the user as a row in the Time Card GUI 500 of FIG. 5. A person skilled in the art will understand that the visual representation of the time card entry is not limited to the Time Card GUI 500 and may be represented in various configurable forms.

Figure 4:
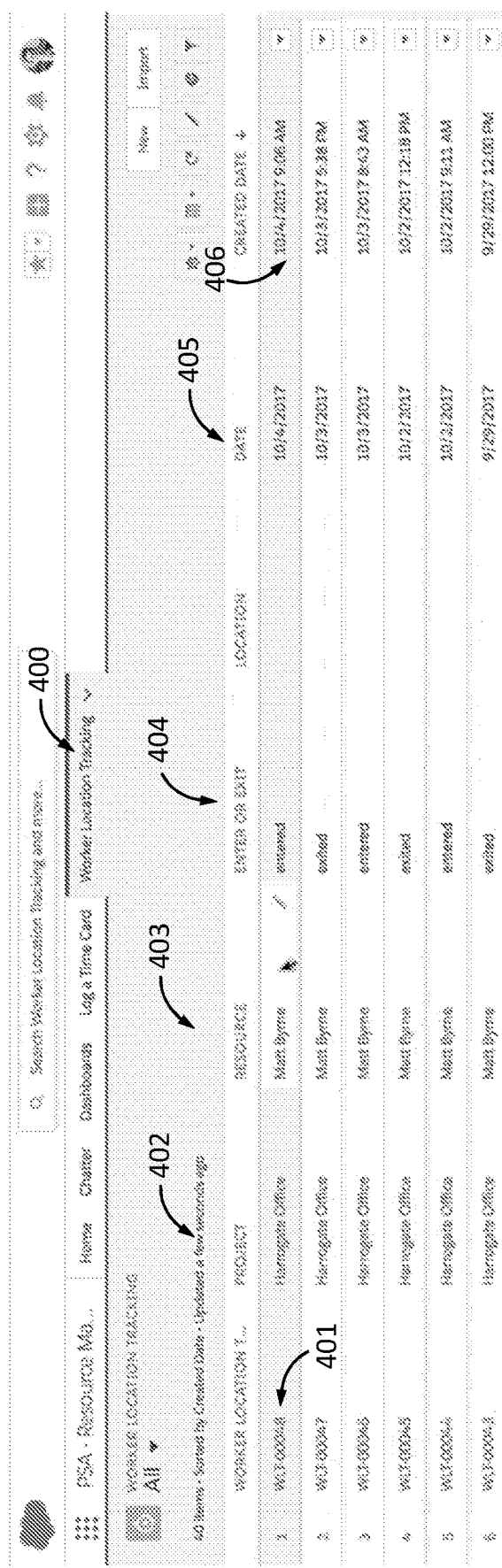
FIG. 4 depicts a graphical user interface (GUI) that displays data and facilitates obtaining mobile device data and generating activity logs.

FIG. 4 is a graphical user interface (GUI) that facilitates the process that obtains mobile device data and generates records associated with the mobile device data according to some embodiments of the invention. The GUI may be run by a processor on a cloud-based server. In one embodiment, the worker location tracking interface 400 of the GUI provides information regarding the time and location of a user of a mobile device. The information is sorted into entries represented by rows. For instance, a first entry 401 occupies a first row of the interface. Each entry includes data fields including a project field 402, resource field 403, enter or exit field 404, date field 405, and time field 406. For instance, entry 401, i.e. row 1 includes a project field 402 indicating that the project is the "Harrogate Office," a resource field 403 that identifies "Matt Byrne" as the resource or employee associated with the entry, enter or exit field 404 that indicates the entry is associated with when the mobile device entered the location, i.e. "Harrogate Office," date field 405 indicating that the data associated with the entry, and created date field 406 indicating that the entry was created on "10/4/2017 9:06 AM." In some embodiments, data such as mobile device data obtained and stored in a record as discussed in FIGS. 2 and 3 are represented as entries in worker location tracking interface 400. One having ordinary skill in the art will understand that various other fields may be displayed in the interface to present mobile device data.

Figure 5:
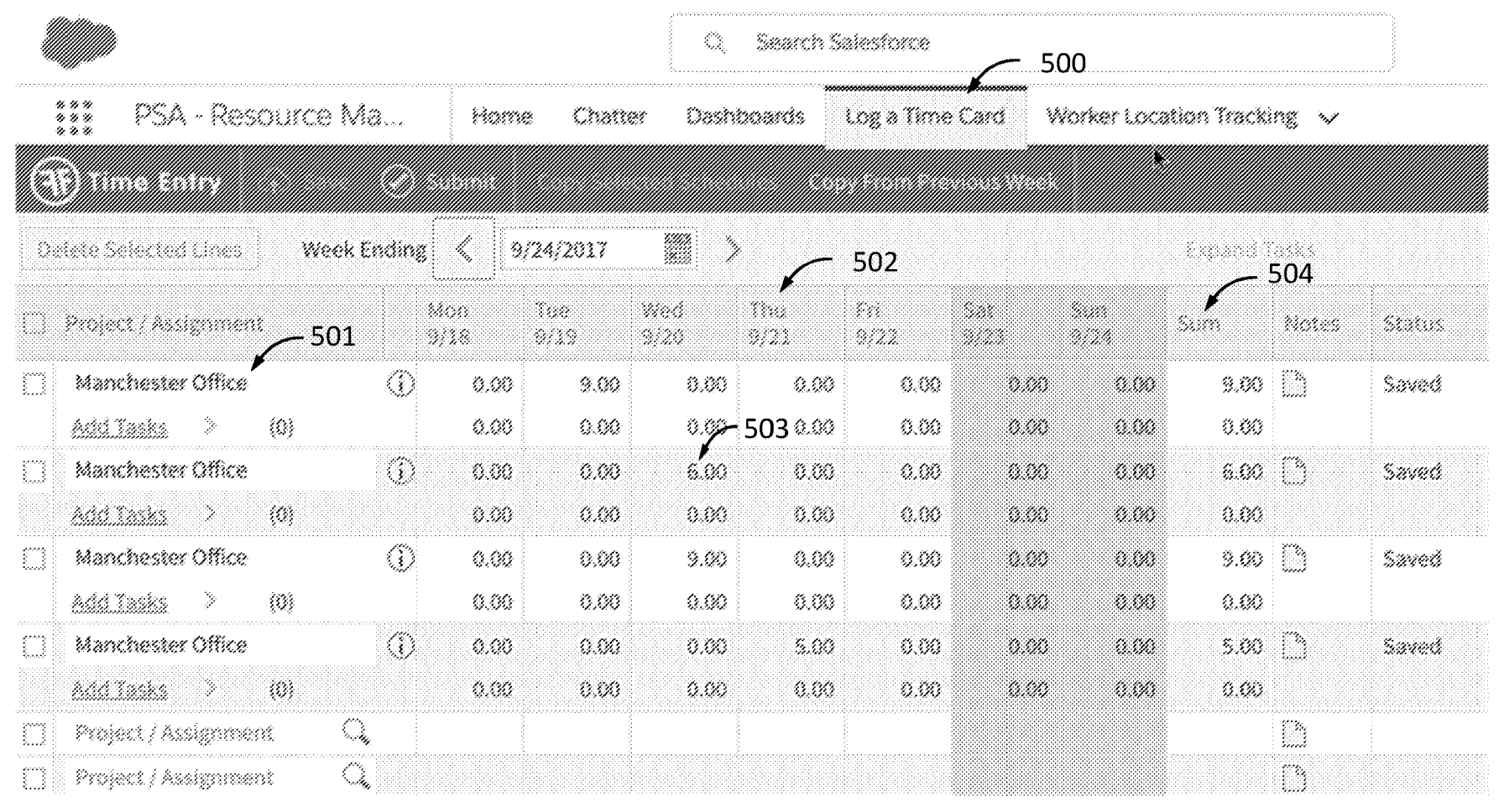

FIG. 5 is a GUI that facilitates the process that obtains mobile device data and generates records associated with the mobile device data according to some embodiments of the invention. The GUI may be run by a processor on a cloud-based server. In one embodiment, time card interface 500 of the GUI provides information regarding a project or assignment 501. Each entry representing a project or assignment occupies a row of the time card interface 500. Each entry includes the duration of work 503 recorded for a particular date 502. Additionally, time card interface 500 includes the total duration of work over a period of time, e.g. over the course of a week. One having ordinary skill in the art will understand that the entries may be arranged and re-arranged in different formats, e.g. monthly or daily view.

Figure 6:
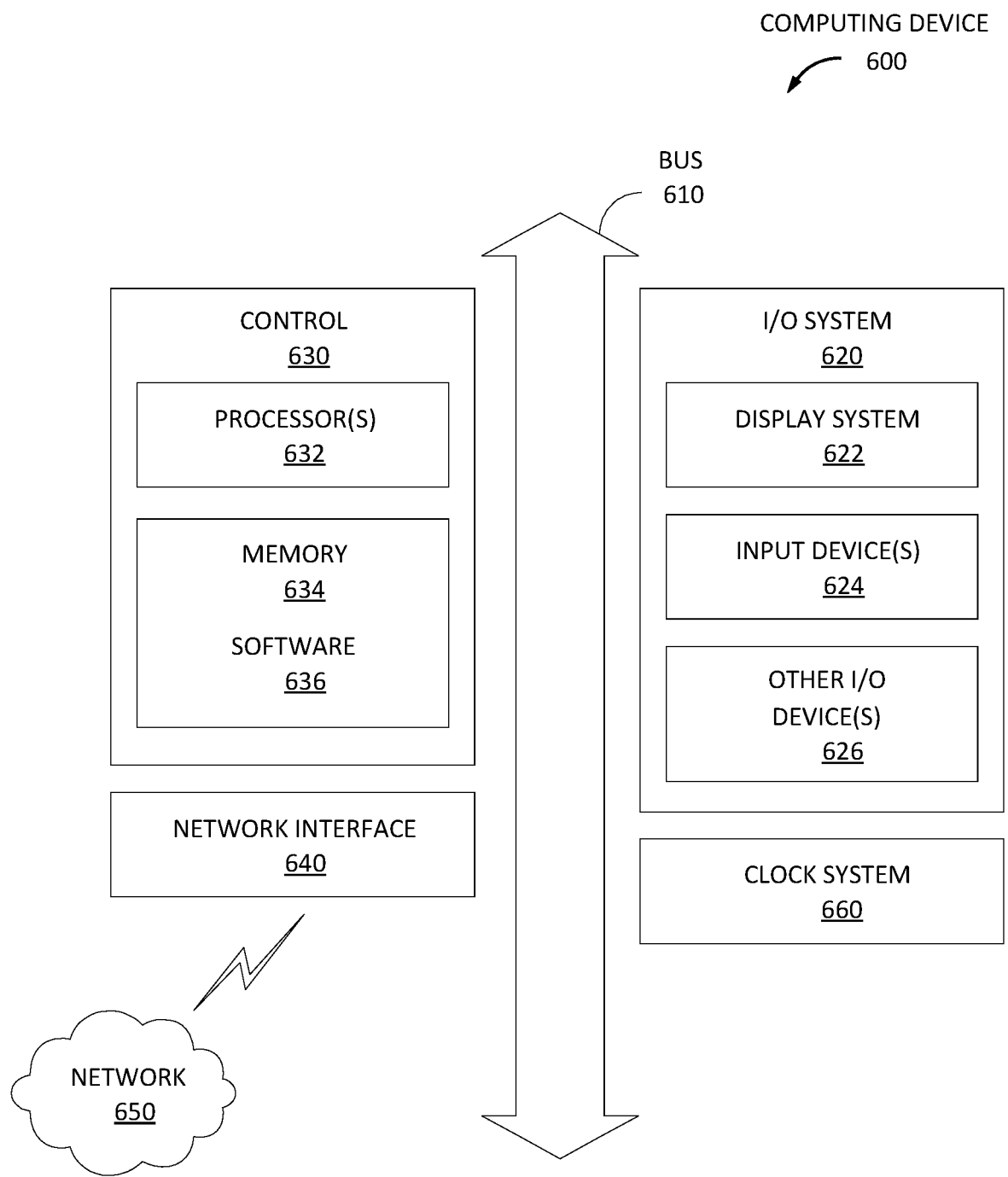
FIG. 6 depicts a block diagram illustrating an example of a processing system in which at least some operations described herein can be implemented.

FIG. 6 is a block diagram illustrating a computing device operable to implement the invention according to some embodiments of the invention. As shown, a computer 600 includes a bus 610 that is operable to transfer data between hardware components. These components include a control 630, e.g. processing system, a network interface 640, an input/output (I/O) system 620, and a clock system 660. The computing device 600 may include other components that are not shown or further discussed for the sake of brevity. One having ordinary skill in the art will understand any hardware and software that is included but not shown in FIG. 6.

The control 630 includes one or more processors 632, e.g. central processing units (CPUs), application specific integrated circuits (ASICs), and/or field programmable gate arrays (FPGAs), and memory 634 (which may include software 636). For example, the memory 634 may include volatile memory, such as random-access memory (RAM) and/or non-volatile memory, such as read-only memory (ROM). The memory 634 can be local, remote, or distributed.

A software program, e.g. software 636, when referred to as implemented in a computer-readable storage medium, includes computer-readable instructions stored in the memory, e.g. memory 634. A processor, e.g. processor 632, is configured to execute a software program when at least one value associated with the software program is stored in a register that is readable by the processor. In some embodiments, routines executed to implement the disclosed embodiments may be implemented as part of operating system (OS) software, e.g. Microsoft Windows® and Linux®, or a specific software application, component, program, object, module, or sequence of instructions referred to as computer programs.

As such, the computer programs typically comprise one or more instructions set at various times in various memory devices of a computer, e.g. computing device 600, which, when read and executed by at least one processor, e.g. processor 632, will cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium, e.g. memory 634.

Network interface 640 may include a modem or other interfaces (not shown) for coupling the computing device 600 to other computers over the network 650. The I/O system 620 may operate to control various I/O devices, including peripheral devices such as a display system 622, e.g. a monitor or touch-sensitive display, and one or more input devices 624, e.g. a keyboard and/or pointing device. Other I/O devices 620 may include, for example, a disk drive, printer, scanner, or the like. Lastly, the clock system 760 controls a timer for use by the disclosed embodiments.

Operation of a memory device, e.g. memory 634, such as a change in state from a binary one (1) to a binary zero (0) (or vice versa) may comprise a visually perceptible physical change or transformation. The transformation may comprise a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Figure 7:
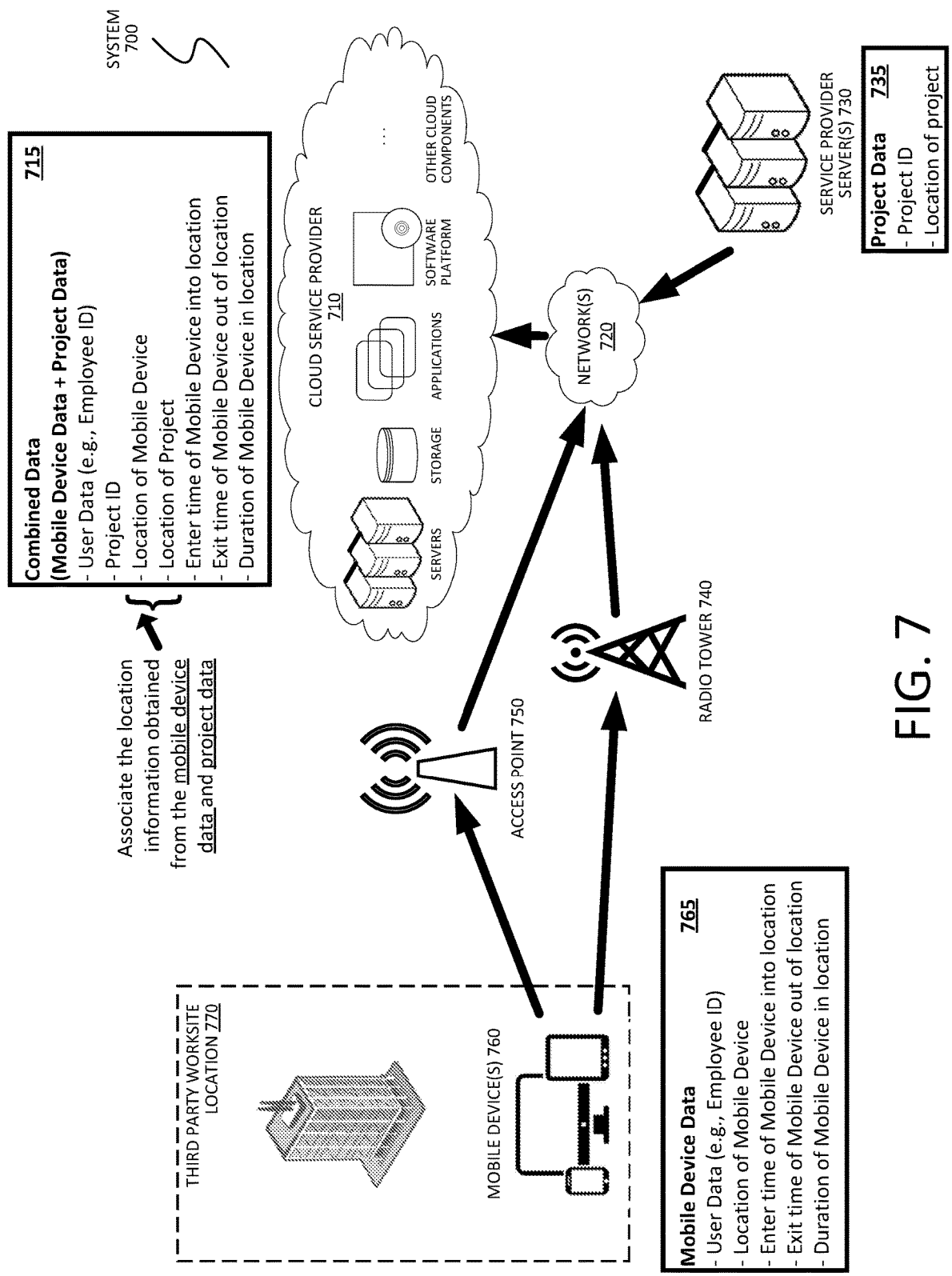
FIG. 7 depicts a block diagram illustrating a communications system according to some embodiments of the present disclosure.

FIG. 7 is a block diagram illustrating a communications system according to some embodiments of the present disclosure. As shown, the communications system 700 includes components such as cloud service provider 710, network(s) 720, service provider server(s) 730, radio tower(s) 740, access point(s) 750, and mobile device(s) 760. Cloud service provider 710 may include functionality facilitated by servers, storage, applications, software platforms, and other components. Mobile device(s) 760 may be located within a third-party worksite location 770. Additionally, mobile device(s) 760 is communicatively coupled to the network(s) 720 via access point 750 and/or radio tower 740.

Mobile device(s) 760 is any type of electronic device that can communicate wirelessly with a network node and/or with another handheld device in a cellular, computer, and/or mobile communications system. Examples of a mobile device(s) 760 include smartphones, (e.g. Apple iPhone, Samsung Galaxy, etc.), tablet computers (e.g. Apple iPad, Samsung Note, Amazon Fire, Microsoft Surface, etc.), wireless devices capable of machine-to-machine (M2M) communication, wearable electronic devices, and any other handheld device that is capable of accessing the network(s) 720. Those skilled in the art will appreciate that the disclosed embodiments may include any number of handheld devices.

Mobile device(s) 760 may store and transmit code (composed of software instructions) and data using machine-readable media, such as non-transitory machine-readable media, (e.g. machine-readable storage media such as magnetic disks, optical disks, read only memory (ROM), flash memory devices, and phase change memory), and transitory machine-readable transmission media (e.g. electrical, optical, acoustical, or other forms of propagated signals, such as carrier waves or infrared signals).

Mobile device(s) 760 can include hardware such as one or more processors coupled to one or more other components, such as non-transitory machine-readable media to store code and/or data, user input/output (I/O) devices, (e.g. a keyboard, a touchscreen, and/or a display), and network connections, e.g. an antenna, to transmit code and/or data using propagating signals. The coupling of the processor(s) and other components is typically through one or more buses and bridges (also referred to as bus controllers). Thus, a non-transitory machine-readable medium of a given electronic device typically stores instructions for execution on processor(s) of that electronic device. One or more parts of an embodiment of the present disclosure may be implemented using different combinations of software, firmware, and/or hardware.

Mobile device(s) 760 can estimate the geographic location of the mobile device(s) 760 from global positioning system (GPS) signals. However, the embodiments are not limited to using GPS signals to estimate a geographic location of the mobile device(s) 760. Instead, any method known, being developed, or not yet developed may be used by the mobile device(s) 760 to estimate its geographic location.

The mobile device(s) 760 can be enabled to access any of the network(s) 720 by using the communications circuitry and the antenna elements as configured in accordance with the selected communications resources. Accordingly, the mobile device(s) 760 can be optimized for local service providers, bands, protocols, frequencies, and/or to comply with local laws or regulations. For example, antenna elements of the mobile device(s) 760 can be separately and/or collectively addressable to optimize access to a local wireless network. In particular, software can implement various loading and tuning routines for automatically switching the antenna elements to form various antenna types for connection to a communications network.

The radio tower 740 and access point 750 can be any type of radio network node that may communicate with mobile device(s) 760 and with another network node. The radio tower 740 or access point 750 may be a network device or apparatus. Examples of network access nodes include a base station, e.g. radio tower 740, an access point, e.g. access point 750, or any other type of network node such as a network controller, radio network controller (RNC), base station controller (BSC), a relay, transmission points, and the like. The system 700 depicts different types of radio tower 740 and access point 750 to illustrate that mobile device(s) 760 may access different types of networks through different types of network access points. For example, a base station, e.g. radio tower 740, can provide access to a cellular telephone system of the network(s) 720. Similarly, an access point, e.g. radio tower 740, is a transceiver that provides access to a computer system of the network(s) 720. The mobile device(s) 760 may select from a plurality of data connections for transmitted the mobile device. For example, the mobile device(s) 760 may select the higher performance connection facilitated by radio tower 740 or access point 750.

The network(s) 720 may include any combination of private, public, wired, or wireless systems such as a cellular telephone network, a computer network, the Internet, and the like. Any data communicated over the network(s) 720 may be encrypted or unencrypted at various locations or along different portions of the networks. Examples of wireless systems include Wideband Code Division Multiple Access (WCDMA), High Speed Packet Access (HSPA), WiMax, Wi-Fi, Wireless Local Area Network (WLAN), and Global System for Mobile Communications (GSM), GSM Enhanced Data Rates for Global Evolution (EDGE) Radio Access Network (GERAN), and other systems that may also benefit from exploiting the scope of this disclosure.

The cloud platform 710 can provide access to a shared pool of configurable computing resources including servers, storage, applications, software platform, networks, services, and the like accessed by the service provider servers 730 to offer add-on applications to mobile device(s) 760. The cloud service provider 710 supports multiple tenants and is commonly referred to as a platform as a service (PaaS). The PaaS is provided to developers for creating the add-on applications that run on the components of the cloud service provider 710. FORCE.COM is an example of a PaaS that hosts applications hosted on SALESFORCE.COM, which is an example of a cloud platform. For example, add-on applications can provide subscription billing services to users using the mobile device(s) 760. The subscription billing services are provided by the service provider servers 730 and include applications built on the software platform of the cloud platform 710.

The service provider servers 730 may include any number of server computers that provide the add-on applications such as project management or customer management services. These services provide data associated with a project or customer. Data may include identification information, physical location information, and telephone number information associated with the project or customer. Although shown separately from the cloud platform 710, the service provider servers 730 may be included as part of the cloud platform 710.

The service provider servers 730 may provide or administer a user interface, e.g. website, accessible from the mobile device(s) 760. The user interface may include features such as dashboard analytics to provide insight into how a business is performing. Examples of businesses that could benefit from subscription billing services range from SaaS (Software as a Service) providers to energy and utilities companies.

The add-on applications provided by the service provider servers 730 are built using a particular programming language. For example, FORCE.COM applications are built using APEX (a proprietary Java-like programming language for FORCE.COM) and VISUALFORCE (an XML syntax typically used to generate HTML). The code used to build applications may include functions that are accessible by the add-on applications.

The system 700 may use a variety of communications standards, protocols, number of frequency bands, frequencies, and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), 3rd Generation Partnership Project (3GPP) related standards, Bluetooth, Wireless Fidelity (Wi-Fi) (e.g. IEEE 802.11a, IEEE 802.11b, IEEE 802.11g and/or IEEE 802.11n), voice over Internet Protocol (VoIP), Wi-MAX, a protocol for e-mail (e.g. Internet message access protocol (IMAP) and/or post office protocol (POP)), instant messaging (e.g. extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed.

In some embodiments, the mobile device(s) 760 generates mobile device data 765. The data may indicate the physical location of the mobile device. For example, the data may indicate that the mobile device(s) 760 is located at worksite location 770. In some embodiments, the physical location may be represented as longitude and latitude coordinates. The data also indicate the time that the mobile device enters or exits worksite location 770. Similarly, the data may also indicate the duration of the mobile device at worksite location 770. The data may also include employee data indicating the employee assigned to the mobile device.

In some embodiments, the service provider server(s) 730 provides project data 735. The project data 735 may include identification information indicative of a project and the physical location associated with the project. In some embodiments, the project may correspond to client or project worksites. For instance, the physical location may be a location of the client's office building. In other examples, the physical location may be a worksite where services are performed or products are delivered for a project or client.

In some embodiments, the cloud service provider 710 associates the mobile device data 765 with the project data 735. In particular, the cloud service provider 710 may match the location identified by the mobile device data 765 with project data 735 identifying the same location. This allows the cloud service provider 710 to pull together data indicating the location and time a mobile device was at a location with the project ID associated with that location into combined data 715.

In one example, mobile device(s) 760 is located at worksite location 770 and generates mobile device data 765 including information identifying worksite location 770. Cloud service provider 710 obtains mobile device data 765 and identifies the location of worksite location 770. Cloud service provider 710 then obtains project data 735 associated with worksite location 770. The cloud service provider 710 then combines the data such that the employee ID, project ID, location of the mobile device (e.g. worksite location 770), enter and exit time into worksite location 770, and duration of the mobile device at worksite location 770 are associated. In some embodiments, the combined data 715 may be formatted into a time card entry. The time card entry may be stored at cloud service provider 710, service provider server(s) 730, or mobile device(s) 760. For example, the records may be used for record keeping, auditing, or payroll purposes.

Aspects of the invention may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While the invention has been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

While the invention has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the invention. All such improvements are considered within the scope of the concepts disclosed herein. Thus, the description is to be regarded as illustrative instead of limiting.

I claim:

1. A computer-implemented method for generating an activity log, comprising:
    obtaining, by a processor, a first record containing a user location data, a timing data, and a user identifier, the user location data indicating a position of a user, and the timing data indicating a time that the user is at a location;
    matching, by the processor, the user location data with a project location data, the project location data associated with a project identifier;
    classifying the timing data as an entry time data by examining a sequence of location data elements and determining that each successive location data element indicates a location closer to the position indicated by the user location data than a previous location data element; and
    classifying the timing data as an exit time data by examining the sequence of location data elements and determining that each successive location data element indicates a location farther to the position indicated by the user location data than the previous location data element;
    calculating a duration time that has elapsed between an entry time and exit time;
    creating, by the processor, a second record including the duration time, the user identifier, and the project identifier; and
    generating, by the processor, a timecard entry indicating the duration time corresponding to time the user spent working on a project.

2. The method of claim 1, wherein the timing data includes the entry time data, the exit time data, and/or the duration time.

3. The method of claim 1, wherein the timing data may be processed to determine the duration time that has elapsed between the entry time and the exit time.

4. The method of claim 1, wherein the user location data indicates the position of the user by capturing the location of a user device.

5. The method of claim 4, wherein the location of the user device is captured by using global positioning system (GPS) signals.

6. The method of claim 1, wherein the user identifier may be a name of the user, user name credential associated with the user, or employee identifier of the user.

7. The method of claim 1, wherein the project location data indicates a physical location of a work site where services are performed or products are delivered.

8. The method of claim 1, wherein location information, timing information, and user information captured by a user device during user activity are used to generate the user location data, the timing data, and the user identifier of the first record.

9. The method of claim 1, further comprising:
transmitting the second record to a remote device for storage, display, or modification.

10. The method of claim 8, wherein the user location data, the timing data, and the user identifier of the first record are stored locally on the user device.

11. The method of claim 1, wherein the processor performs the method on a Salesforce cloud-based platform.

12. The method of claim 1, wherein the first record may be updated by obtaining additional user location data, timing data, user identifier from a user device.

13. A device for generating an activity log, the device comprising:
a processor; and
a memory that includes instructions which, when executed by the processor, cause the processor to:
generate a first record containing user location data, a timing data, and a user identifier, the user location data indicating a position of a user device, and the timing data indicating a time that the user device is at a location;
access project data containing a project location data, each project location data associated with a project identifier;
match the user location data with the project location data;
classify the timing data as an entry time data by examining a sequence of location data elements and determining that each successive location data element indicates a location closer to the position indicated by the user location data than a previous location data element; and
classify the timing data as an exit time data by examining the sequence of location data elements and determining that each successive location data element indicates a location farther to the position indicated by the user location data than the previous location data element;
calculate a duration time that has elapsed between an entry time and exit time;
create a second record including the duration time, the user identifier, and the project identifier; and
generate a timecard entry indicating the duration time corresponding to time a user spent working on a project.

14. The device of claim 13, wherein the timing data may be processed to determine the duration time that has elapsed between the entry time and the exit time.

15. The device of claim 13, wherein the user location data indicates the position of the user by capturing the location of the user device.

16. The device of claim 13, wherein the user identifier may be a name of the user, user name credential associated with the user, or employee identifier of the user.

17. The device of claim 13, wherein the project location data indicates a physical location of a work site where services are performed or products are delivered.

18. The device of claim 13, wherein location information is determined using global positioning system (GPS) signals.

19. The device of claim 13, wherein the processor performs the method on a Salesforce cloud-based platform.

* * * * *